United States Patent [19]

Gausrab et al.

[11] Patent Number: 4,882,950

[45] Date of Patent: Nov. 28, 1989

[54] DRIVE LINE FOR FOUR WHEEL DRIVE VEHICLES

[75] Inventors: Klaus Gausrab, Ostfildern; Joachim Hauser, Weissach; Robert Mueller, Mönsheim, all of Fed. Rep. of Germany

[73] Assignee: Dr. Ing, h.c.V. Porsch AG, Weissach, Fed. Rep. of Germany

[21] Appl. No.: 148,021

[22] Filed: Jan. 25, 1988

[30] Foreign Application Priority Data

Jan. 23, 1987 [DE] Fed. Rep. of Germany ....... 3701843

[51] Int. Cl.$^4$ ............................ F16H 1/42; F16H 1/28
[52] U.S. Cl. ........................................ 74/714; 74/710; 74/711; 180/248; 180/249; 384/571
[58] Field of Search ................. 74/714, 710, 711, 789, 74/606 R; 384/571, 585, 584; 180/248, 249

[56] References Cited

U.S. PATENT DOCUMENTS

| | | | |
|---|---|---|---|
| 1,916,233 | 7/1933 | Riblet | 384/585 |
| 2,791,130 | 5/1957 | Boughner | 74/695 |
| 3,768,336 | 10/1973 | Wharton | 74/714 |
| 3,782,796 | 1/1974 | Rickley et al. | 384/584 |
| 4,203,635 | 5/1980 | Reiter | 384/571 |
| 4,464,973 | 8/1984 | Radler, Jr. | 180/6.44 X |
| 4,520,691 | 6/1985 | Radler, Jr. | 74/790 |
| 4,522,515 | 6/1985 | Miki et al. | 384/571 |
| 4,691,593 | 9/1987 | Mueller | 74/714 |
| 4,714,129 | 12/1987 | Mueller | 180/248 |
| 4,732,497 | 3/1988 | Sawa et al. | 384/571 X |
| 4,757,727 | 7/1988 | Teraoka et al. | 74/714 X |

FOREIGN PATENT DOCUMENTS

| | | |
|---|---|---|
| 451703 | 10/1927 | Fed. Rep. of Germany . |
| 875114 | 4/1953 | Fed. Rep. of Germany . |
| 2754967 | 6/1978 | Fed. Rep. of Germany . |
| 3417699 | 11/1985 | Fed. Rep. of Germany . |
| 3507490 | 3/1986 | Fed. Rep. of Germany . |

Primary Examiner—Leslie A. Braun
Assistant Examiner—William Gehris

[57] ABSTRACT

A planetary transmission having a centrifugal brake is connected into a vehicle drive line and, when there is a rotational speed difference between an input shaft and an output shaft, transmits torque to the output shaft. Due to a special mounting of the input shaft and the output shaft of the planetary transmission, the occurring forces and torques are transmitted effectively, in which the case the parts of the planetary transmission can be manufactured in a cost-effective way and are easy to assemble.

8 Claims, 3 Drawing Sheets

DRIVE LINE FOR FOUR WHEEL DRIVE VEHICLES

BACKGROUND AND SUMMARY OF THE INVENTION

The invention relates to a vehicle drive line between two driven axles of a four wheel drive vehicle or the like. More specifically, the present invention relates to an improved design of a planetary transmission connecting the drive for the two driven axles.

In U.S. Patent Texts Nos. 4,464,973 and 4,520,691, planetary transmissions are described that have an input shaft and a first sun gear as well as a second sun gear that has an output shaft. The sun gears interact with planet gears that are provided at a planet carrier. However, the mounting of the input shaft and of the output shaft does not meet specifically defined power transmission requirements of a drive line, particularly those of a passenger car equipped with an all-wheel drive.

DE-PS 3 507 490 shows a planetary transmission having a centrifugal brake that is connected into the drive line of a passenger car equipped with an all-wheel drive, this drive line connecting two driven axles.

It is an object of the invention to design the components, specifically the input shaft and the output shaft of the planetary transmission connected into a drive line, in such a way that, while they can be manufactured cost-effectively and are easy to mount, they absorb and transmit the occurring forces as well as torques in an operationally appropriate way.

This objective is achieved by providing a housing, an input shaft projecting into the housing and having an open bore, and an output shaft having an end projecting into the open bore of the input shaft and supported by a supporting plate which closes the housing.

The main advantages that are achieved by means of the invention are that the input shaft and the output shaft are disposed and integrated into the planetary transmission or its housing in such a way that the occurring forces and torques in the drive train are transmitted without any problem. The mounting of both shafts and also of the parts of the planetary transmission is simple, particularly because of the bearing insert of the supporting plate and the fixing of the input shaft at the two tapered roller bearings. The components that are arranged in the housing can be manufactured in a simple way.

In preferred embodiments where the planetary transmission is equipped with a centrifugal brake and is integrated into the drive line of a passenger car equipped with an all-wheel drive, the housing that houses the planetary transmission and the centrifugal brake is shaped advantageously with respect to space in that the brake shoes of the centrifugal brake are provided between the sun gears of the planetary transmission and the housing. The light-metal alloy housing that has a circular-cylindrical cross-section, for absorbing the frictional forces, on the interior side, has a surrounding iron-metallic ring. This ring may be cast together with the housing as an insert or may be fastened at the latter by form or friction fitting.

Other objects, advantages and novel features of the present invention will become apparent from the following detailed description of the invention when considered in conjunction with the accompanying drawings.

DETAILED DESCRIPTION OF THE DRAWINGS

Figure 1:
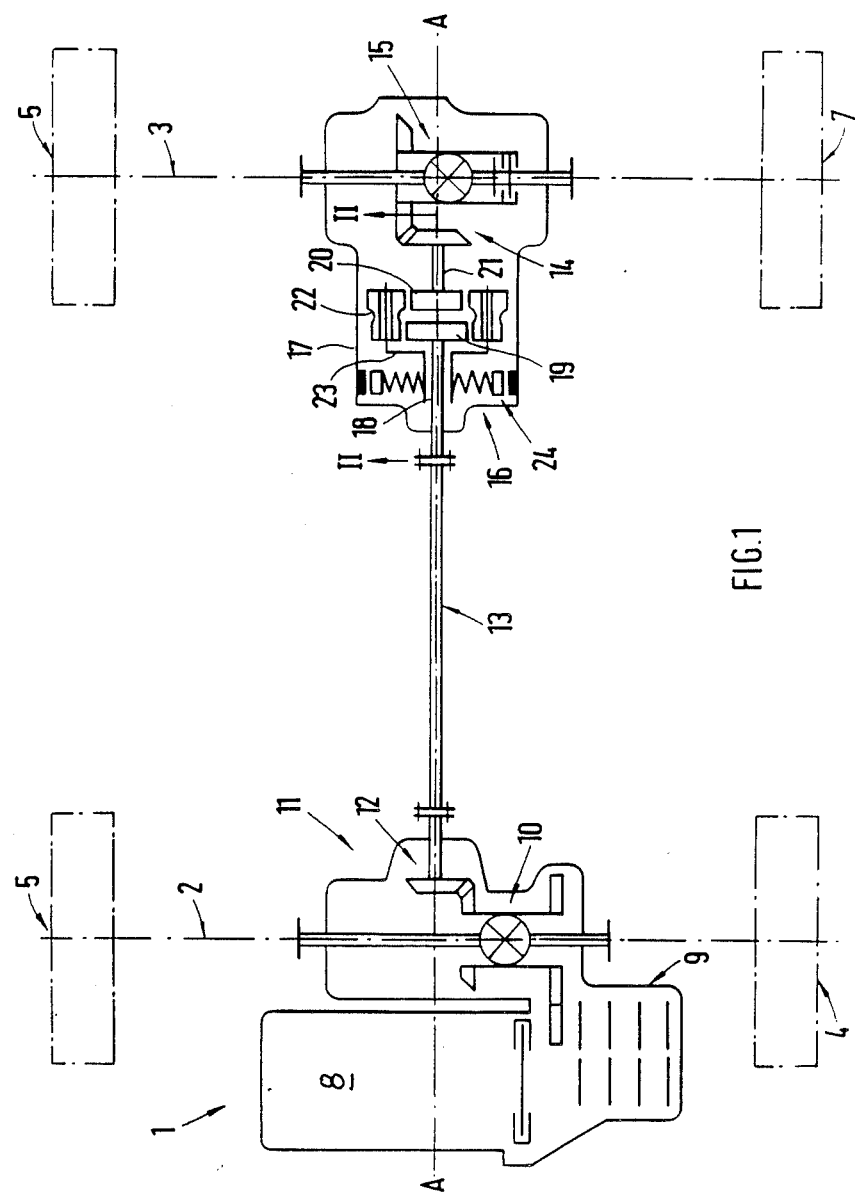
FIG. 1 is a diagrammatical top view of a motor vehicle having a drive line between two driven axles constructed in accordance with a preferred embodiment of the invention.

The motor vehicle 1 comprises a front axle 2 and a rear axle 3. The axles are connected with wheels 4, 5, 6, 7. In front of the front axle 2, an internal-combustion engine 8 is installed that is arranged transversely with respect to the longitudinal axis A—A of the vehicle and that drives the front axle 2 by means of a manual transmission 9 and a differential gear 10. At reference number 11, an angular gear 12 is mounted that interacts with the differential 10 and is connected to a drive line 13. The drive line 13 is coupled with another angular gear 14 adjacent to the rear axle 3. Angular gear 14 interacts with a differential gear 15 of the rear axle 3.

A planetary transmission 16 is connected into the drive line 13 and is housed in a housing 17. The planetary transmission 16 comprises an input shaft 18 having a first sun gear 19 that is connected in a torsionally fixed way and a second sun gear 20 that is mounted on an output shaft 21 in a torsionally fixed way. The shafts 18 and 21 as well as the gears 19 and 20 are arranged coaxially with respect to one another. In addition, the two sun gears 19 and 20 interact with planet gears 22 that are held by a planet carrier 23.

The first sun gear 19 has a somewhat larger number of teeth than the second sun gear 20, the planet gears having a development that takes this design into account. In addition, the first sun gear 19 has a high transmission ratio with respect to the planet carrier; approximately 16:1. A centrifugal brake 24 is connected with the planet carrier 23. In the case of a rotational speed difference between the front axle 2 and the rear axle 3—front axle is spinning—the planetary transmission 16 and the centrifugal brake 24 cause a torque transmission to the rear axle 3.

Figure 2:
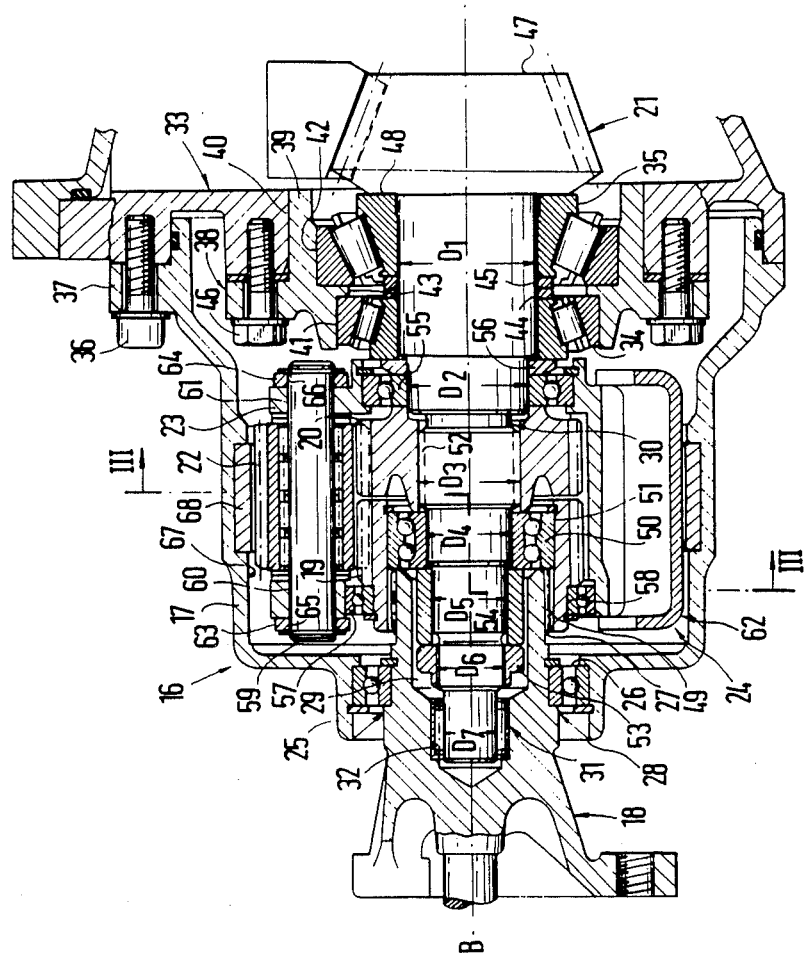
FIG. 2 is an enlarged sectional view taken along Line II—II of FIG. 1.
Figure 3:
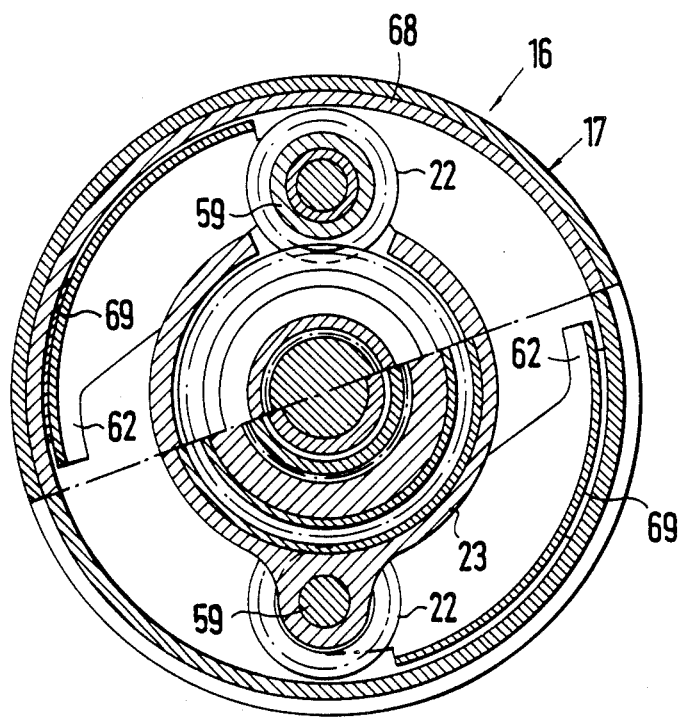
FIG. 3 is a sectional view taken along Line III—III of FIG. 2.

According to FIG. 2, the housing 17 that consists of a light-metal alloy and has a circular-cylindrical cross-section, for the mounting of the input shaft 18, has an axle journal 25 that is provided at the floor of the cup-shaped housing and houses the input shaft 18 by means of a ball bearing 26. The input shaft 18, by means of a shaft 27, projects into the housing 17 and is provided with a bore 29 that extends approximately to the free end 28 of the axle journal 25.

The output shaft 21, by means of a shaft 30, projects through the housing 17 and into the input shaft 18 and, at reference number 31, that is located approximately in the area of the axle journal 25, by means of a needle bearing 32, is disposed in this input shaft.

On the side that faces away from the axle journal 25, the output shaft 21, by means of two tapered roller bearings 34, 35, is disposed in a supporting plate 33 that closes the cup-shaped housing 17. The supporting plate 33, that extends vertically with respect to the central longitudinal axis B—B of the planetary transmission 16, is fastened by means of screws 36 at a housing flange 37.

In the illustrated embodiment, the supporting plate 33 consists of a light-metal material. For this reason, the tapered roller bearings 34, 35 are inserted into an iron-metallic gray cast iron bearing insert 38. The bearing insert 38, with a collar 39, rests in a bore 40 of the supporting plate 33 and is provided with receiving devices 41, 42 for the tapered roller bearings 34, 35. Between the receiving devices 41, 42, a web 43 is provided at the bearing insert 38, the tapered roller bearings 34, 35 resting against this web 43. These tapered roller bearings 34, 35 also rest against the spacing disks 44, 45 that surround the output shaft 21. In addition, the bearing insert 38, is held at the supporting plate 33 by means of screws 46.

Next to the roller bearing 35 that has a slightly larger outside diameter than the tapered roller bearing 34 and faces away from the input shaft 18, the output shaft 21 is provided with a pinion 47 that has a stop 48 supporting itself at the tapered roller bearing 35.

The first sun gear 19, via a toothing 49 that is provided between the shaft 27 and the first sun gear 19, is in a torsionally fixed connection with the input shaft 18 and, by means of a ball bearing 50 that is inserted into a bore 51 of that sun gear, is disposed on the output shaft 21. The second sun gear 20, via a serration 52, is arranged on the output shaft 21 in a torsionally fixed way.

The output shaft 21, is braced with respect to the tapered roller bearing 34 facing the input shaft 18, by means of a threaded nut 53, a spacing bush 54, the ball bearing 50 in the first sun gear 19, the second sun gear 20, a ball bearing 55 for the planet carrier 23 and a spacing disk 56. The nut 53 and the spacing bush 54 extend inside the bore 29 that at that point has a larger diameter than in the area of the needle bearing 32.

For receiving the different coaxial components of the output shaft 21, it has stepped shaft sections between the tapered roller bearings 34, 35 in the bearing insert 38 and the needle bearing 32 of the output shaft 21, the diameters ($D_1$, $D_2$, $D_3$, $D_4$, $D_5$, $D_6$ and $D_7$) of these shaft sections becoming almost uniformly smaller in the direction of the needle bearing 32.

The planet carrier 23, on one side, is disposed on the output shaft 21 by means of the ball bearing 55, and, on the other side, is disposed on a bearing section 58 of the first sun gear 19 by means of a ball bearing 57. The planet gears 22 are mounted on bearing pins 59 that penetrate bores 60, 61 of the planet carrier 23. In addition, the bearing pins 59 are used for receiving brake shoes 62 of the centrifugal brake 24 that are U-shaped in their cross-section. The legs 63, 64 of the brake shoes 62 have bores 65, 66 in which the bearing pins 59 extend in sections.

The brake shoes 62 are arranged between the housing 17 and the sun gears 19, 20.

In the area of the brake shoes 62, at the interior side 67 of the housing 17, a surrounding iron-metallic-gray cast iron-ring 68 is provided. The ring 68 may be cast as an insert, together with the housing 17 or may be held at it by a frcition fit. A brake lining of the brake shoe 62 has the reference number 69.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A drive line between two driven axles of a motor vehicle having an all-wheel drive, into which a planetary transmission is connected that has a housing and comprises an input shaft having a first sun gear and a second sun gear at an output shaft; said sun gears engaging with planet gears mounted at a planet carrier, the output shaft being arranged in a bore of the first sun gear by means of a ball bearing;

wherein the input shaft is disposed in an axle journal adjacent one end of the housing by means of a ball bearing, and projects with a shaft section into the housing, the input shaft being provided with a bore extending approximately to the axle journal;

wherein the output shaft is disposed approximately in the area of the axle journal inside the bore, preferably by means of a needle bearing;

wherein the output shaft, at an opposite end of the housing located away from the axle journal, is disposed at a supporting plate of the housing, preferably by means of two tapered roller bearings; and wherein a web is attached to said supporting plate and is provided with two bearing receiving areas for the two tapered roller bearings with the web extending between the two receiving areas for supporting the two tapered roller bearings and wherein the supporting plate is attached to the housing by screws.

2. A drive line according to claim 2, wherein the receiving devices are provided at a bearing insert connected with the supporting plate by means of screws.

3. A drive line according to claim 2, wherein the bearing insert consists of an iron-metallic material and the supporting plate consists of a light-metal material.

4. A drive line according to claim 1, wherein the tapered bearing is axially aligned with the output shaft and wherein the output shaft rests against one of the tapered roller bearings located further away from the input shaft than the other tapered roller bearing by means of a stop, and is braced in the axial direction by means of a nut against the other tapered roller bearing closest to the input shaft.

5. A drive line according to claim 4, wherein the tightening effect of the nut on the other tapered roller bearing closest to the input shaft takes place by means of spacing bush, an inner race of the ball bearing at the first sun gear, the second sun gear, an inner race of a ball bearing for the planet carrier, and a spacing disk.

6. A drive line according to claim 1, wherein the output shaft, between the tapered roller bearings in the bearing insert and its mounting in the bore of the input shaft, has stepped shaft sections for receiving the different coaxial components, in such a way that the shaft sections become smaller in their diameter from the tapered roller bearings and the bore.

7. A drive line according to claim 1, wherein a centrifugal brake is connected with its brake shoes located between the sun gears and the housing.

8. A drive line between two driven axles of a motor vehicle having an all-wheel drive, into which a planetary transmission is connected that thas a housing and comprises an input shaft having a first sun gear and a second sun gear at an output shaft; said sun gears engaging with planet gears mounted at a planet carrier; the output shaft being arranged in a bore of the first sun gear by a ball bearing; the input shaft is disposed at an axle journal at one end of the housing; the output shaft, at an opposite end of the housing located away from the axle journal, is disposed at a supporting plate of the housing by two tapered roller bearings; wherein a web is attached to said supporting plate and is provided with two bearing receiving areas for the two tapered roller bearings with the web extending between the two receiving areas for supporting the two tapered roller bearings; and wherein the supporting plate is attached to the housing by screws.

* * * * *